United States Patent [19]
Pasquire et al.

[11] 3,774,006
[45] Nov. 20, 1973

[54] RESISTANCE WELDING CONTROL
[75] Inventors: Derek James Pasquire, Witney;
Peter Edward Burton, Wallingford,
both of England
[73] Assignee: Press Steel Fisher Limited, Cowley,
Oxford, England
[22] Filed: Dec. 20, 1971
[21] Appl. No.: 210,282

Related U.S. Application Data
[63] Continuation of Ser. No. 54,223, July 13, 1970, abandoned.

[30] Foreign Application Priority Data
July 16, 1969 Great Britain .................. 35,817/69
Nov. 12, 1969 Great Britain .................. 55,347/69

[52] U.S. Cl. .............................. 219/111, 219/117
[51] Int. Cl. ............................................. B23k 9/10
[58] Field of Search .................... 219/108, 111, 117

[56] References Cited
UNITED STATES PATENTS
2,024,542  12/1935  Simon .................................. 219/110
3,518,399   6/1970  Van Der Helst ..................... 219/110
3,588,438   6/1971  Van Der Helst ..................... 219/117
3,558,849   1/1971  Catherall et al. ..................... 219/110
3,586,815   6/1971  Eijnsbergen et al. ............... 219/110

*Primary Examiner*—J. V. Truhe
*Assistant Examiner*—Gale R. Peterson
*Attorney*—Harold T. Stowell et al.

[57] ABSTRACT

The time for which welding current, in a resistance welding operation, is allowed to flow is made up of two consecutive parts. The first is that taken by the rate of change of weld resistance to reach a predetermined value. The second is computed as a function of the time for the rate of change to reach said value.

13 Claims, 1 Drawing Figure

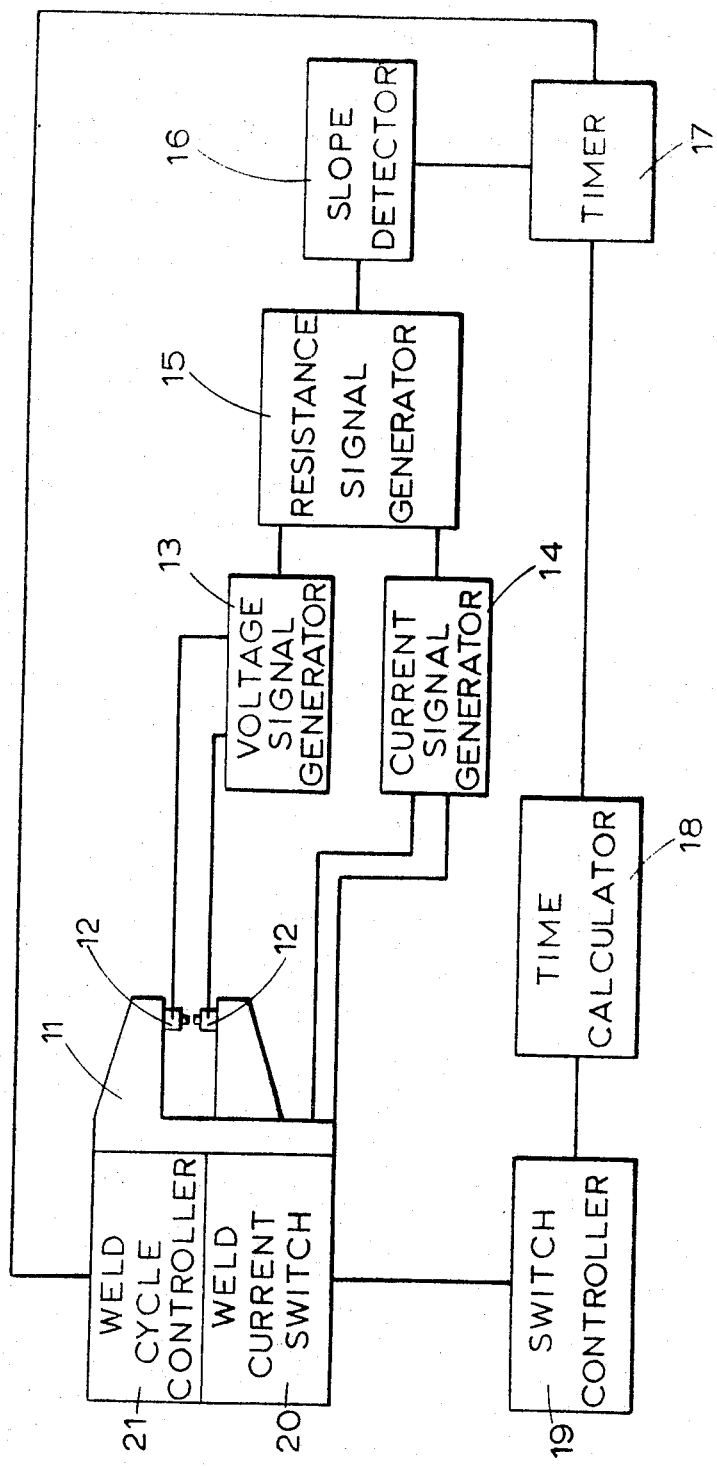

RESISTANCE WELDING CONTROL

This is a continuation, of application Ser. No. 54,223, filed July 13, 1970, now abandoned.

This invention relates to resistance welding and concerns particularly a method of, and apparatus for, controlling the time during which welding current flows.

Normally in resistance welding the welding current time is controlled by a timer which ensures that the current flows for a fixed time or number of cycles. When such apparatus is used for dissimilar workpieces or workpiece conditions it is usually necessary to adjust the timer in order to ensure that satisfactory welds are produced. However, various proposals have been made heretofore for controlling the weld time by a controller which is responsive to various changes that take place during welding, such as, for example, resistance changes across the welding electrodes, and expansion of the workpiece during welding. Such controllers, which are known as "feedback controllers" can, under certain conditions, be used to maintain weld quality without the need for any adjustment when the workpieces differ.

An object of this invention is to provide a method of resistance welding which can produce satisfactory welds with a range of dissimilar workpieces of mild steel and also with workpieces of other materials, and a welding controller for effecting the method.

The invention results from an extended investigation into the relationship between resistance changes, expansion, weld time and weld strength which indicates that with mild steel workpieces an approximate empirical relationship exists between the weld time needed to produce a satisfactory weld and the time taken for the electrical resistance to reach a maximum, or in those cases where the resistance curve — as plotted against time — does not reach a clearly defined peak, the time taken for the slope of the curve to approach zero.

According to the present invention a method of resistance welding includes:

a. monitoring the rate of change of weld resistance or a function thereof; and
b. allowing welding current to flow for additional time after the rate of change of weld resistance has reached a predetermined value, said additional time being computed as a function of the time for the rate of change to reach said value.

In a preferred form of the invention the additional time is made up of the time to reach the predetermined value multiplied by a predetermined constant the multiple being adjusted by adding a predetermined time value. Typically the predetermined constant is in the range 0.2 to 3.5 and the predetermined time value is in the range −100 to +100 milliseconds.

Conveniently the method includes deriving a series of signals proportionally related to the weld resistance, and registering the time when successive signals indicate that the rate of increase has reached said predetermined value.

In most cases said predetermined rate of change is chosen to be when the rate of change is approaching zero, or, in other words, when the resistance is nearing its peak value. An acceptable compromise is to be aimed at between weld strength and weld time.

Preferably the invention also includes so controlling the amplitude of the welding current that, at least after a short initial period, the amplitude of the current is substantially constant; and advantageously the amplitude is so controlled that it falls during said short initial period.

Advantageously the amplitude of the current refers to root means square current, but the invention is also applicable with reference to average current or peak current.

According to another aspect of the invention a resistance welding controller includes:

a. switch means adapted to allow welding current to flow;
b. means for monitoring the workpiece weld resistance or a function thereto;
c. means for detecting when the rate of change of the resistance or the function thereof has reached a predetermined value;
d. means for calculating an additional time ($T_t$) for which welding current is allowed to flow defined by the identity $T_t = (T_p \times A) + B$ wherein $T_p$ is the time taken for the rate of change to reach the predetermined value, $T_t \geq T_p$, and A and B are constants; and
e. means for opening the switch means when the time $T_t + T_p$ has expired.

Preferably the means for calculating the additional time incorporates means for preselecting the value of B in accordance with the gauge, condition and material of the workpiece.

Preferably the value of A is about 2 but it may lie in the range 0.2 to 3.5. Preferably the value of B is about +40 milliseconds (with $T_t$ and $T_p$ measured in milliseconds) or at least lies in the range −100 to +100 milliseconds.

Preferably the controller also includes means for so controlling the amplitude of the welding current that at least after a short initial period the amplitude is substantially constant; and advantageously the controller also includes means for causing the amplitude of the current to fall during said short initial period.

It will be understood that in most cases the controller will also require main voltage fluctuation compensating means to ensure that a drop in mains voltage does not cause an apparent drop in weld resistance.

Conveniently the controller may be arranged to sample the resistance every half cycle of current flow after an initial "blanking" period which may be of fixed, or alternatively of variable duration.

One embodiment of the invention will now be described, solely by way of example, with reference to the accompanying drawing which illustrates schematically a block circuit diagram of a resistance welding controller.

In the apparatus shown in the drawing the controller is linked to a resistance welder indicated generally at 11. A voltage signal generator 13 is connected across the welding electrodes 12 and is adapted to produce a signal proportional to the voltage across the workpiece, and a voltage signal generator 14 is connected to produce a signal proportional to the welding current.

The signal generators 13 and 14 may include an amplification stage in which the output signal is adjustable with respect to the input signal.

The output of the signal generators 13 and 14 are connected to a resistance signal generator 15 adapted to compare the signals and thereby produce an output signal proportionally related to the workpiece resistance.

The output of the resistance signal generator 15 is connected to a slope detector 16 adapted to detect when the rate of change of the resistance signal has reached a predetermined value and to then provide an output signal to the timer 17.

The timer 17 is connected to a time calculator 18, described in more detail below, which is connected to a switch controller 19 adapted to open welding current switch 20 associated with a conventional weld cycle controller 21.

The cycle controller 21 is also connected directly to the timer 17.

The mode of operation of the controller will now be described. When an operator initiates a welding cycle by actuating the conventional weld cycle controller 21, the electrodes 12 are moved into contact with a workpiece to effect "squeeze" in known manner. The cycle controller 21 then closes the associated weld current switch to allow welding current to flow and also starts the timer 17.

The voltage signal generator 13 and the resistance signal generator 14 pass their respective signals to the resistance signal generator 15 which compares the signals, for example, by subtracting one from the other, to produce an output signal proportionally related to the weld resistance across the workpiece. This signal is monitored by the slope detector 16 which detects when the rate of change has reached a predetermined value (conveniently approximating to maximum resistance) and then provides an output signal to the timer 17.

The timer 17 registers the time taken to reach a said predetermined value and passes this information to the time calculator 18.

The time calculator 18 then calculates the additional time $T_t$ that welding current should be allowed to flow by multiplying the time $T_p$ ($T_t$ being equal to or greater than $T_p$) to reach the predetermined rate of change of resistance by the predetermined multiplicand A and then adding or subtracting a predetermined time constant B. B as stated above lies in the range −100 to +100 milliseconds which range includes a zero value of B.

When the said additional time has expired the time calculator 18 signals the switch controller 19 which immediately opens the weld current switch associated with the cycle controller 20 thereby terminating the weld and resetting the timer 17.

In one, more specific, example of such an embodiment the timer 17 produces a voltage signal that is proportional to the elapsed time, and, when the predetermined rate of change of resistance is detected, this voltage signal is passed to the time calculator 18 which imparts a delay proportional to such voltage and a fixed delay before passing the signal to the switch controller 19.

What is claimed is:

1. In a method of resistance welding in which weld current is passed through a workpiece the steps of
   a. monitoring the rate of change of weld resistance or a function thereof; and
   b. allowing welding current to flow for an additional time after the rate of change of weld resistance has reached a predetermined value, said additional time being computed as a function of the time for the rate of change to reach said value.

2. A method of resistance welding as claimed in claim 1 in which the predetermined value of the rate of change of weld resistance is zero and the weld resistance is at a maximum.

3. A method of resistance welding as claimed in claim 1 in which the addition time is made up of the time to reach the predetermined value multiplied by a predetermined constant the multiple being adjusted by adding a predetermined time value.

4. A method of resistance welding as claimed in claim 3 in which the predetermined constant is in the range of 0.2 to 3.5 and the predetermined time value is in the range of −100 to +100 milliseconds.

5. A method of resistance welding as claimed in claim 4 in which the value of the predetermined constant is one.

6. A method of resistance welding as claimed in claim 4 in which the predetermined time is 40 milliseconds.

7. A method of resistance welding as claimed in claim 1 in which the time for the rate of change of resistance to reach a predetermined value is derived from a series of signals proportionately related to weld resistance and registering the time when successive values of such signals indicate the rate of increase has reached the predetermined value.

8. A resistance welding controller whereby weld current is allowed to pass through a workpiece characterised by the provision of:
   a. switch means adapted to allow welding current to flow;
   b. means for monitoring the workpiece weld resistance or a function related thereto;
   c. means for detecting when the rate of change of the resistance or the function thereof has reached a predetermined value;
   d. means for calculating an additional time ($T_t$) for which welding current is allowed to flow defined by the identity $T_t = (T_p \times A) + B$ wherein $T_p$ is the time taken for the rate of change to reach the predetermined value, $T_t \geq T_p$, and A and B are constants; and
   e. means for opening the switch means when the time ($T_p + T_t$) has expired.

9. A resistance welding controller as claimed in claim 8 characterised in that the predetermined value of the rate of change is zero and the weld resistance is a maximum.

10. A resistance welding controller as claimed in claim 9 characterised in that the value of A is in the range of 0.2 to 3.5.

11. A resistance welding controller as claimed in claim 10 characterised in that the value of A is one.

12. A resistance welding controller as claimed in claim 9 characterised in that the value of B is in the range of −100 to +100 milliseconds.

13. A resistance welding controller as claimed in claim 12 characterised in that the value of B is about +40 milliseconds.

* * * * *